United States Patent
Onuki

(10) Patent No.: US 11,073,910 B2
(45) Date of Patent: Jul. 27, 2021

(54) LINE-OF-SIGHT DETECTION APPARATUS

(71) Applicant: Sony Interactive Entertainment Inc., Tokyo (JP)

(72) Inventor: Yoshikazu Onuki, Yokohama (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 75 days.

(21) Appl. No.: 16/161,467

(22) Filed: Oct. 16, 2018

(65) Prior Publication Data

US 2019/0146584 A1    May 16, 2019

(30) Foreign Application Priority Data

Nov. 15, 2017    (JP) .............................. JP2017-219750

(51) Int. Cl.
*G06F 3/01*    (2006.01)
*G06K 9/32*    (2006.01)

(52) U.S. Cl.
CPC .............. *G06F 3/015* (2013.01); *G06F 3/013* (2013.01); *G06K 9/3233* (2013.01)

(58) Field of Classification Search
CPC ........ G06F 3/015; G06F 3/013; G06K 9/3233
See application file for complete search history.

(56) References Cited

U.S. PATENT DOCUMENTS

2010/0317988 A1* 12/2010 Terada ............... A61B 5/04842
                                                                            600/544
2014/0347265 A1* 11/2014 Aimone ................. G02C 11/10
                                                                            345/156

* cited by examiner

*Primary Examiner* — Shaheda A Abdin
(74) *Attorney, Agent, or Firm* — Katten Muchin Rosenman LLP

(57) ABSTRACT

Disclosed herein is a line-of-sight detection apparatus connected to a brain-wave measurement apparatus configured to measure brain waves of a user, a pupil observation apparatus configured to observe a pupil of the user, and a display apparatus. The line-of-sight detection apparatus includes: an attention position identification block configured to identify, by use of measurement results by the brain-wave measurement apparatus obtained when a video having a predetermined pattern is displayed on a screen of the display apparatus, a position of attention of the user inside the screen; and a correlation identification block configured to identify a correlation between a line-of-sight direction of the user and a position inside the screen by use of observation results by the pupil observation apparatus obtained when the attention position is identified and the identified attention position.

6 Claims, 5 Drawing Sheets

LINE-OF-SIGHT DETECTION APPARATUS

BACKGROUND

The present disclosure relates to a line-of-sight detection apparatus configured to identify a position to which the line-of-sight of a user is directed inside a display screen, a control method for this apparatus, and a control program for this apparatus.

Recently, line-of-sight detection apparatuses have been appearing that are configured to identify where on a display screen a user is watching. Such line-of-sight detection apparatuses identify the line-of-sight directions of a user by radiating an infrared ray onto the pupil of the user and observing the pupil of the user such as observing the reflection point appearing on the pupil, for example.

Besides, researches are being conducted on technologies for identifying a position inside a display screen to which the line-of-sight of a user is directed by measuring the brain waves (Electroencephalogram: EEG) of the user. With such technologies, the screen is divided into two or more areas, for example, so as to display a video that changes with a different pattern for each of the divided areas. The pattern different for each area denotes a video that blinks with a frequency and a phase different for each area, for example. A reaction for the blinking of light at a position focused by a user appears in the results of the measurement of the brain waves of the user. Hence, analyzing the brain-wave measurement results provides the identification of an area in screen to which the user is directing the line-of-sight.

SUMMARY

Of the technologies described above, the method using pupil's observation results allows the identification of the line-of-sight direction of a user; however, this method cannot identify to which position inside a display screen this direction corresponds. Therefore, calibration processing that identifies the correlation between the line-of-sight direction and the display screen is required. This calibration processing is executed with a procedure in which a user sequentially watches two or more reference positions inside a display screen, for example, thereby identifying a line-of-sight direction of the user with each timing. However, such calibration processing requires time and labor for the user. In addition, if the calibration processing has ended once and a shift in the positional relation between the user and the display apparatus occurs, then the calibration processing needs to be executed again, thereby increasing the load of the user.

By contrast, the method based on brain waves allows the identification of a position inside a display screen directly focused by the user. However, this method requires to display a video that blinks with a specific pattern all over the display screen for a while in identifying a position of attention, thereby significantly impairing the degree of freedom of the video.

Therefore, it is desirable to provide a line-of-sight detection apparatus that is configured to identify a position of user attention inside a display screen in a method allowing comparatively small user load and comparatively small influence to a video, a control method therefor, and a control program therefor.

According to an embodiment of the present disclosure, there is provided a line-of-sight detection apparatus connected to a brain-wave measurement apparatus configured to measure brain waves of a user, a pupil observation apparatus configured to observe a pupil of the user, and a display apparatus. This line-of-sight detection apparatus includes: an attention position identification block configured to identify, by use of measurement results by the brain-wave measurement apparatus obtained when a video having a predetermined pattern is displayed on a screen of the display apparatus, a position of attention of the user inside the screen; and a correlation identification block configured to identify a correlation between a line-of-sight direction of the user and a position inside the screen by use of observation results by the pupil observation apparatus obtained when the attention position is identified and the identified attention position.

According to another embodiment of the present disclosure, there is provided a control method of a line-of-sight detection apparatus connected to a brain-wave measurement apparatus configured to measure brain waves of a user, a pupil observation apparatus configured to observe a pupil of the user, and a display apparatus. This control method includes: identifying, by use of measurement results by the brain-wave measurement apparatus obtained when a video having a predetermined pattern is displayed on a screen of the display apparatus, a position of attention of the user inside the screen; and identifying a correlation between a line-of-sight direction of the user and a position inside the screen by use of observation results by the pupil observation apparatus obtained when the attention position is identified and the identified attention position.

According to still another embodiment of the present disclosure, there is provided a program for a computer connected to a brain-wave measurement apparatus configured to measure brain waves of a user, a pupil observation apparatus configured to observe a pupil of the user, and a display apparatus. The program includes: by an attention position identification block, identifying, by use of measurement results by the brain-wave measurement apparatus obtained when a video having a predetermined pattern is displayed on a screen of the display apparatus, a position of attention of the user inside the screen; and by a correlation identification block, identifying a correlation between a line-of-sight direction of the user and a position inside the screen by use of observation results by the pupil observation apparatus obtained when the attention position is identified and the identified attention position. This program may be provided in a state of being stored in a computer-readable non-transitory information storage medium.

DETAILED DESCRIPTION OF THE PREFERRED EMBODIMENTS

The following describes embodiments of the present disclosure with reference to drawings.

Figure 1:
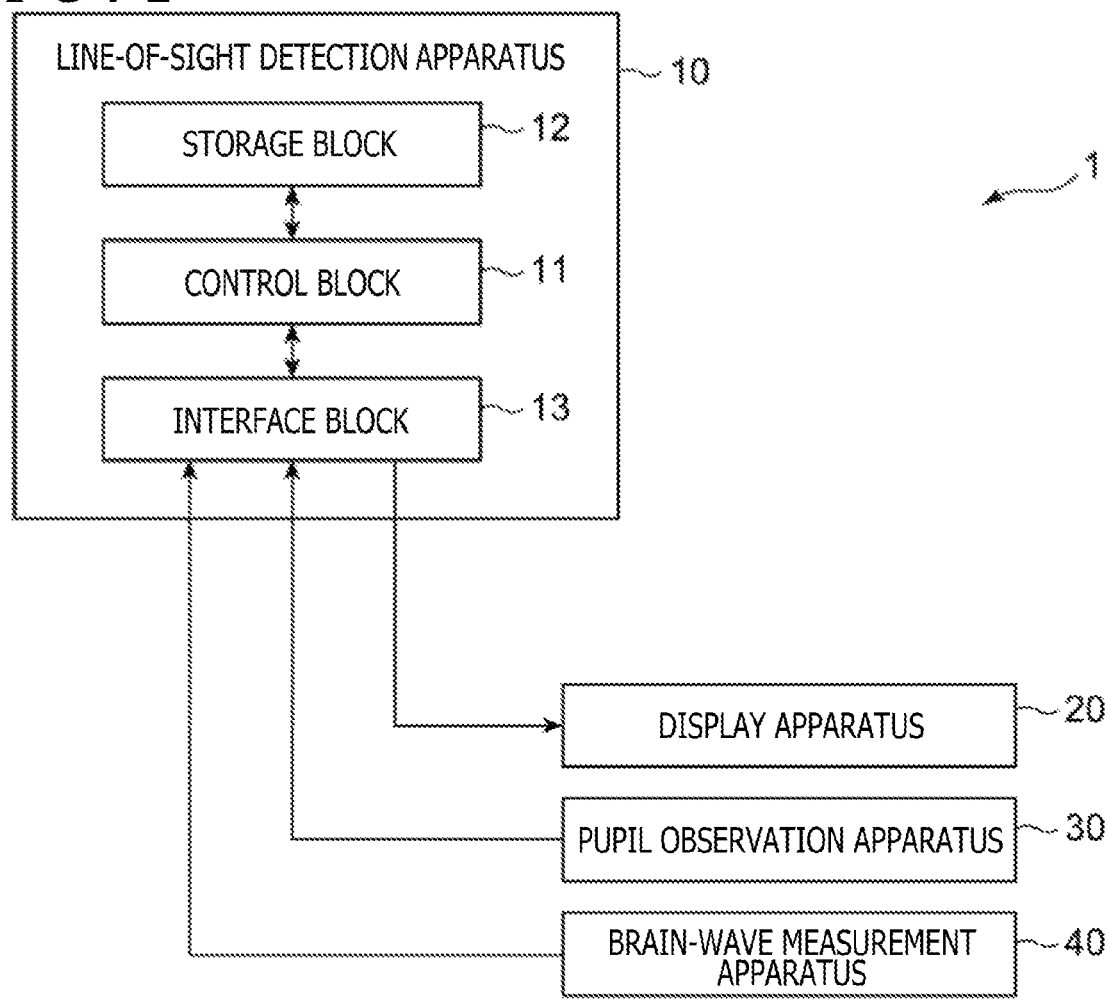
FIG. 1 is a system configuration diagram illustrating an attitude detection system including a line-of-sight detection apparatus practiced as one embodiment of the present disclosure.

Now, referring to FIG. 1, there is depicted a system configuration diagram illustrating a line-of-sight detection system 1 including a line-of-sight detection apparatus 10 practiced as one embodiment of the present disclosure. As depicted in this diagram, the line-of-sight detection system 1 has a line-of-sight detection apparatus 10, a display apparatus 20, a pupil observation apparatus 30, and a brain-wave measurement apparatus 40.

The line-of-sight detection apparatus 10 is an information processing apparatus such as a stationary game machine or a personal computer and, as depicted in FIG. 1, has a control block 11, a storage block 12, and an interface block 13.

The control block 11 has at least one processor and executes various kinds of information processing as instructed by a program stored in the storage block 12. Specific examples of the processing to be executed by the control block 11 will be later described in detail. The storage block 12 includes at least one memory device such as a random access memory (RAM) that stores a program to be executed by the control block 11 and data to be processed by this program.

The interface block 13 is connected to the display apparatus 20, the pupil observation apparatus 30, and the brain-wave measurement apparatus 40 in a wired or wireless manner, thereby sending and receiving various kinds of data to and from these apparatuses. To be more specific, the interface block 13 sends a video signal to the display apparatus 20. In addition, the interface block 13 receives the data obtained by measuring a user from the pupil observation apparatus 30 and the brain-wave measurement apparatus 40.

The display apparatus 20 displays a video corresponding to the video signal received from the line-of-sight detection apparatus 10, thereby presenting the video to the user. It should be noted that the display apparatus 20 may be a head-mounted display or the like that is used as worn on the head of the user. In what follows, the region in which the display apparatus 20 displays a video is referred to as a display screen S.

In order to identify the line-of-sight direction of a user, the pupil observation apparatus 30 observes the pupil of the user and sends the result of the observation to the line-of-sight detection apparatus 10. The pupil observation apparatus 30 has a camera, an infrared sensor, and so on. Further, the pupil observation apparatus 30 may include a light-emitting block configured to radiate an infrared ray or the like to the pupil of the user for observation. Still further, the pupil observation apparatus 30 may be worn on the head of the user or arranged at a position away from the user. Yet further, if the display apparatus 20 is a device that is used as worn on the head of the user, the pupil observation apparatus 30 may be arranged inside the display apparatus 20.

The brain-wave measurement apparatus 40 measures the brain waves of the user. To be more specific, the brain-wave measurement apparatus 40 has a sensor that is worn on the head of the user and sends an electrical signal detected by this sensor to the line-of-sight detection apparatus 10.

Figure 2:
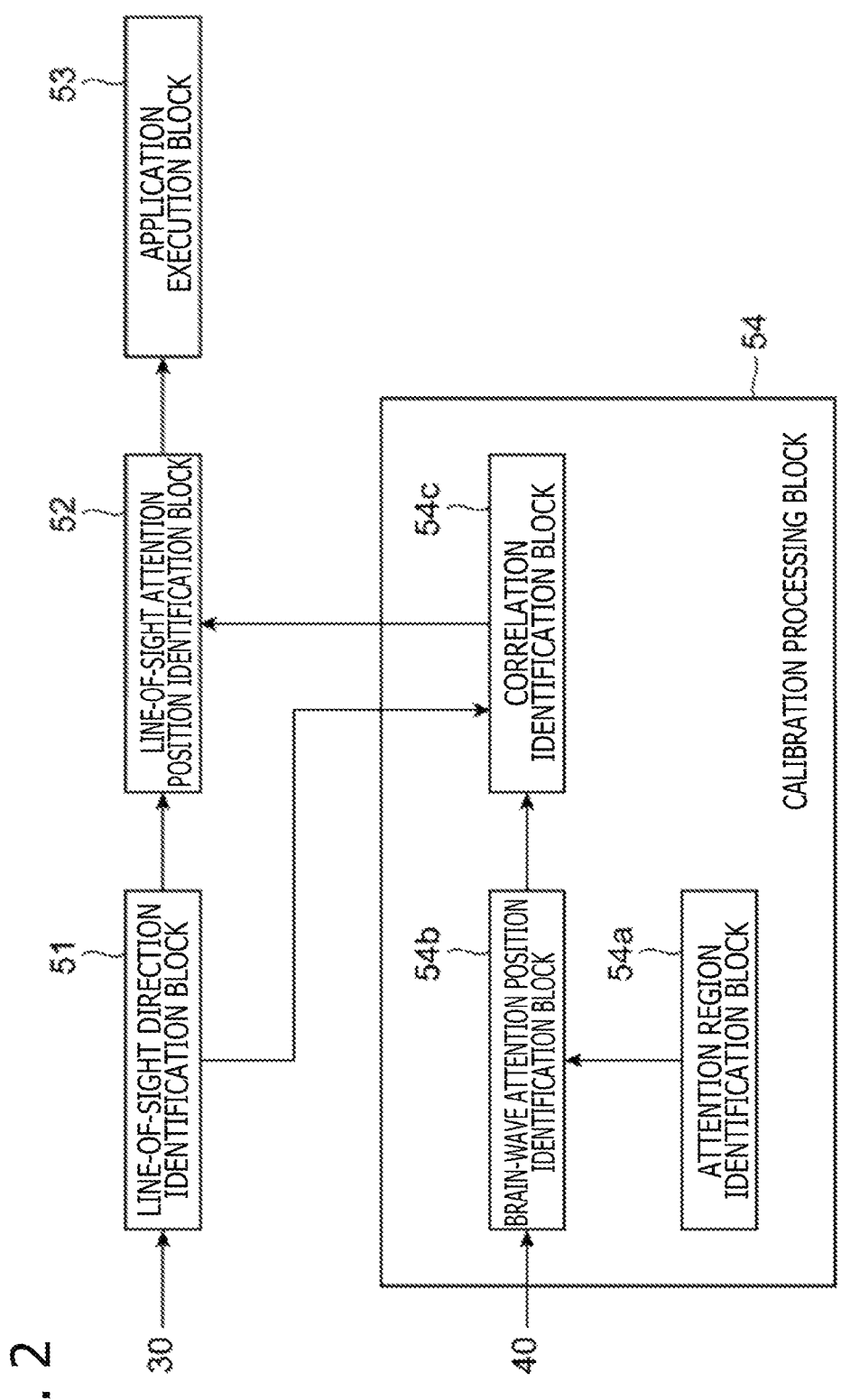
FIG. 2 is a functional block diagram illustrating functions of the line-of-sight detection apparatus practiced as one embodiment of the present disclosure.

The following describes functions to be realized by the line-of-sight detection apparatus 10 with reference to the functional block diagram depicted in FIG. 2. As depicted in FIG. 2, the line-of-sight detection apparatus 10 functionally has a line-of-sight direction identification block 51, a line-of-sight attention position identification block 52, an application execution block 53, and a calibration processing block 54. These functions are realized by executing, by the control block 11, a program stored in the storage block 12. This program may be provided to the line-of-sight detection apparatus 10 via a communication network such as the Internet, or as stored in a computer-readable information storage medium such as an optical disc.

The line-of-sight direction identification block 51 identifies the line-of-sight direction of the user by use of the results of the observation done by the pupil observation apparatus 30. To be more specific, the line-of-sight direction identification block 51 identifies the line-of-sight direction of the user by use of the position of the pupil included in the results of the observation done by the pupil observation apparatus 30, the position of a light reflection point appearing on the pupil, and so on.

The line-of-sight attention position identification block 52 identifies the position watched by the user inside the display screen S by use of the information about the line-of-sight direction identified by the line-of-sight direction identification block 51. In what follows, the position inside the display screen S, to which the user is paying close attention, i.e. to which the line-of-sight of the user is directed, is referred to as an attention position P. Here, the correlation between the line-of-sight direction of the user and the position inside the display screen S (hereafter referred to as line-of-sight/screen correlation) is identified by the calibration processing block 54 to be described later. By use of the line-of-sight/screen correlation identified by the calibration processing block 54, the line-of-sight attention position identification block 52 converts the line-of-sight direction into the attention position P inside the display screen S.

The application execution block 53 is realized by the control block 11 executing an application program. To be more specific, the application execution block 53 may execute a variety of programs, such as a game program, of which contents to be displayed on the display screen S of the display apparatus 20 are updated in accordance with manipulations by the user. Further, it is assumed that, in the present embodiment, the application execution block 53 uses, as one type of user input, the information about the attention position P to be identified by the line-of-sight attention position identification block 52.

The calibration processing block 54 executes the processing (hereafter referred to as calibration processing) for identifying the above-mentioned line-of-sight/screen correlation. To be more specific, the calibration processing block 54 functionally has an attention region identification block 54a, a brain-wave attention position identification block 54b, and a correlation identification block 54c. The following describes the content of the calibration processing that is realized by these functions.

The attention region identification block 54a identifies a region estimated that the user is currently paying attention in the display screen S. In what follows, a part of region to be identified by the attention region identification block 54a inside the display screen S is referred to as an attention region A. A specific example of a method of identifying the attention region A by the attention region identification block 54a will be described later.

Unlike the line-of-sight attention position identification block 52, the brain-wave attention position identification block 54b identifies the attention position P on which the user focuses inside the display screen S by use of the results of the measurement done by the brain-wave measurement apparatus 40. To be more specific, the brain-wave attention position identification block 54*b* displays a video of a predetermined pattern on the display screen S. This predetermined pattern may be a video that blinks each of two or more areas inside the display screen S with a different pattern (a different frequency, a different phase, or the like) from that of the other areas, for example. In what follows, a video having a predetermined pattern to be displayed for the identification of the attention position P by the brain waves by the brain-wave attention position identification block 54*b* is referred to simply as a pattern video. Analyzing the waveforms appearing in the brain waves of the user during displaying such a pattern video allows the brain-wave attention position identification block 54*b* to identify to which of the two or more areas the user is paying attention. For example, in blinking two or more areas with different frequencies, the waveform corresponding to the frequency of the area to which the user is paying attention appears in the brain waves. Therefore, identifying the frequency of the waveform appearing in the brain waves included in the results of the measurement done by the brain-wave measurement apparatus 40 allows the identification of the area to which the user is paying attention. The representative position (the center point, for example) of this area is identified as the attention position P.

Especially, in the present embodiment, it is assumed that the brain-wave attention position identification block 54*b* does not display a pattern video all over the display screen S but selectively displays a pattern video into the attention region A identified by the attention region identification block 54*a*. If the estimation of the attention region A has been done correctly, then the attention position P should exist inside the attention region A and therefore the possibility that the user is paying attention to the outside of the attention region A is low. Therefore, the brain-wave attention position identification block 54*b* divides only the inside of the attention region A into two or more areas as pattern video and displays the video blinking with a different pattern for each of the two or more areas. On the other hand, a normal video (a video drawn by the application execution block 53) is kept displayed in regions other than the attention region A. Then, by use of the results of the measurement of the brain waves of the user during displaying of a video that partially includes such a pattern video, the position inside the attention region A to which the user is paying attention is identified. This setup eliminates the necessity for displaying a video for blinking all over the display screen S in identifying the attention position P by use of the brain waves, thereby minimizing the influence to the video in display.

The correlation identification block 54*c* identifies a line-of-sight/screen correlation by use of the information about the attention position P identified by the brain-wave attention position identification block 54*b* and the information about the line-of-sight direction identified by the line-of-sight direction identification block 51. To be more specific, the correlation identification block 54*c* correlates the information about the line-of-sight direction identified by the results of the observation done by the pupil observation apparatus 30 while the identification of the attention position P is executed by the brain-wave attention position identification block 54*b* with the identified attention position P. Executing such processing on two or more attention positions P inside the display screen S allows the acquisition of a correlation between a given position inside the display screen S and a line-of-sight direction, namely, a parameter of a conversion equation for converting a line-of-sight direction into a position inside the display screen S.

Use of the information about the line-of-sight/screen correlation obtained by the calibration processing as described above allows the line-of-sight attention position identification block 52 to identify the attention position P by use of the information about the line-of-sight direction identified by the line-of-sight direction identification block 51. Thus, correlating the attention position P identified by use of the brain waves with the line-of-sight direction identified by use of the results of the observation of the pupil allows the line-of-sight detection apparatus 10 related with the present embodiment to identify the line-of-sight/screen correlation without requesting the user to execute an operation of paying attention to a particular position two or more times. In addition, narrowing down the attention region A in advance eliminates the necessity of displaying a pattern video all over the display screen S in executing the identification of the attention position P by use of the brain waves, so that there is no need to allocate a time dedicated to calibration processing. Hence, even during displaying of a video which is drawn by the application execution block 53 and indicative of the results of the processing of an application program, calibration processing can be executed.

The following describes some specific examples of a method by which the attention region identification block 54*a* identifies the attention region A.

First, an example of an identification method to be executed in accordance with the contents to be displayed inside the display screen S is described as a first example. In this example, the attention region identification block 54*a* acquires the information related with an object of attention in display from the application execution block 53. Here, an object of attention is a display element assumed that the user is paying attention at that point of time and is identified by the application execution block 53. In a specific example, if the application execution block 53 is displaying two or more optional objects (menu items, for example) on the display screen S and the user selects any one of these optional objects by manipulating a manipulation device, then it is assumed that the line-of-sight of the user is directed to the selected object. Therefore, the attention region identification block 54*a* identifies, as the attention region A, a region including the object selected from among the optional objects.

Figure 3:
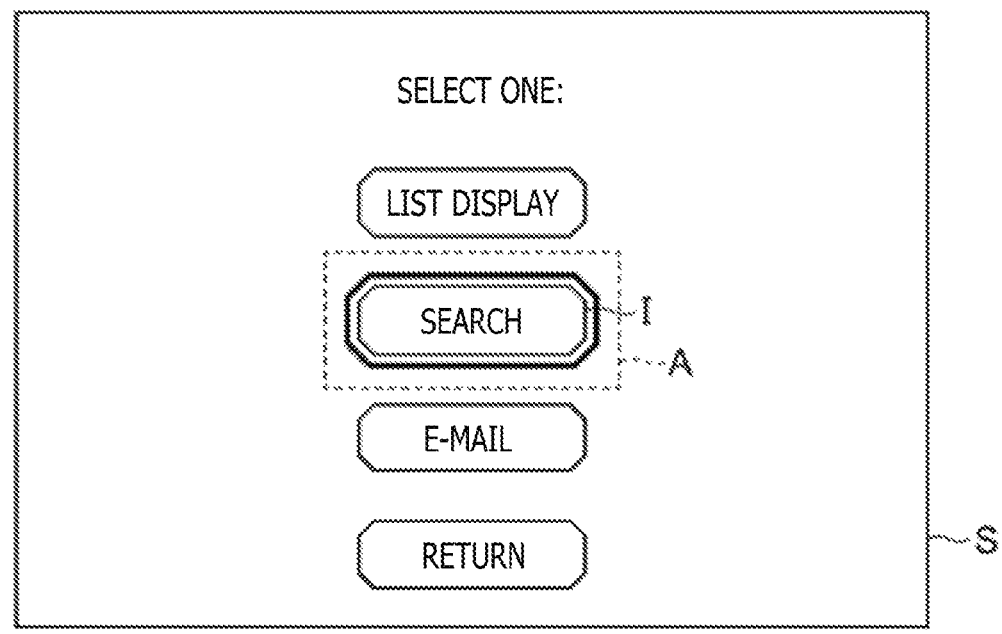
FIG. 3 is a diagram illustrating one example of a region of attention that is set inside a display screen.

Referring to FIG. 3, there is depicted a diagram illustrating one example of the attention region A set inside the display screen S in the above-mentioned example. In this diagram, a menu screen including two or more menu items is displayed on the display screen S, one of the menu items, menu item I, being in a selected state. Then, the attention region A is set so as to include this menu item I.

Figure 4:
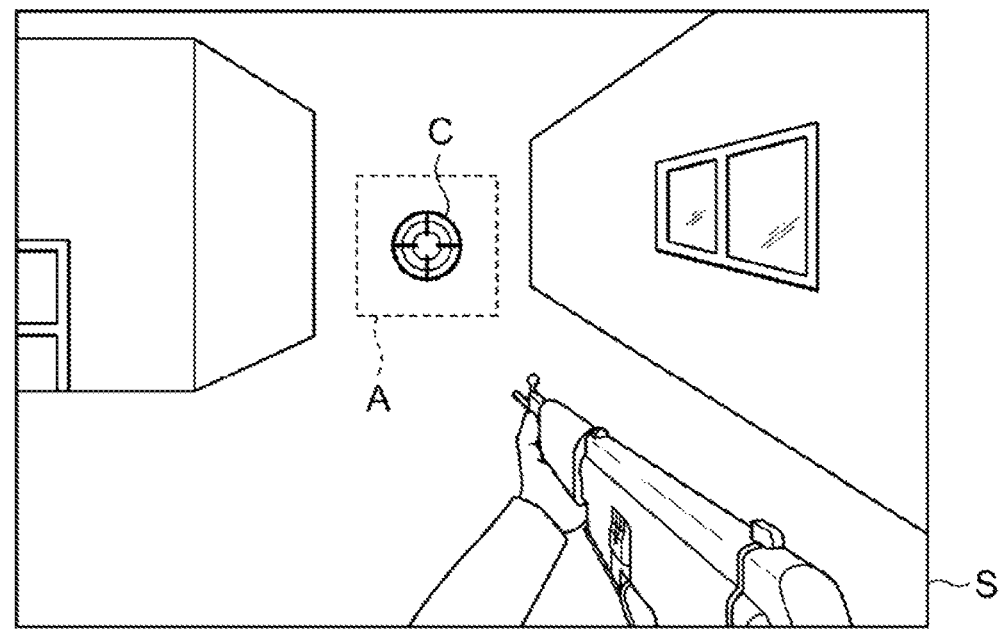
FIG. 4 is a diagram illustrating another example of a region of attention that is set inside a display screen.

The attention region identification block 54*a* may identify not only the selected menu item but also a region including various kinds of objects in attention as the attention region A. In one example, if the application execution block 53 is displaying, inside the display screen S, an object traveling in accordance with a manipulation instruction given by the user, then the attention region identification block 54*a* identifies a region around that object including this object as the attention region A. In a specific example, if the application execution block 53 is executing a shooting game program, then a sighting mark C indicative of a gun-sight is displayed inside the display screen S, the sighting mark C moving inside the display screen S in accordance with a manipulation done by the user. The attention region identification block 54*a* may set the surrounding of this sighting mark C as the attention region A. FIG. 4 is a diagram illustrating one example of the attention region A in this case. Further, if the application execution block 53 is executing a program of a game in which a user character to be displayed inside the display screen S is manipulated, the attention region identification block 54a may set a region including this user character as the attention region A. Still further, if the user is able to manipulate a cursor, a pointer, and so on that are displayed inside the display screen S, a region around these cursor, pointer, and so on may be set as the attention region A.

Further, after identifying a line-of-sight/screen correlation by the execution of calibration processing once, the attention region identification block 54a may identify the attention region A on the basis of the attention position P to be identified by the line-of-sight attention position identification block 52. If there occurs a shift in the positional relation between the user and the display apparatus 20 after completion of the calibration once, the line-of-sight/screen correlation may also be changed. Therefore, it is desirable, while the user is using the line-of-sight detection apparatus 10, for the calibration processing block 54 to repetitively execute calibration processing with a predetermined timing, such as the timing of the acceptance of an instruction from the user or the timing of the passing of a predetermined time from the last calibration. In such a case, in the execution of the second and subsequent calibration processing operations, it is assumed that there have been no significant change from the line-of-sight/screen correlation obtained by the last calibration processing. Therefore, when the second and subsequent calibration processing operations are executed, the attention region identification block 54a may identify, as the attention region A, a region having a predetermined size around the attention position P identified by the line-of-sight attention position identification block 52 on the basis of the line-of-sight/screen correlation obtained as a result of the last calibration.

Especially, by use of the attention position P identified by the line-of-sight attention position identification block 52, the application execution block 53 may sometimes draw an image by applying a technology known as foveated rendering. To be more specific, in drawing an image to be displayed on the display screen S, the application execution block 53 draws the region in the proximity of the attention position P with a comparatively high resolution, while drawing other regions with a comparatively low resolution. This technique allows the displaying of an image drawn with a high resolution for the region focused by the user, while saving the load of the drawing processing as a whole. Here, an image drawn by foveated rendering in which two or more resolutions exist at the same time is written as a composite image and the region (the region that includes the attention position P identified by the line-of-sight attention position identification block 52) drawn with the highest resolution in the composite image is referred to as a high-resolution region H and the other regions as low-resolution regions. It should be noted that a low-resolution region may also be divided into two or more regions in accordance with distances up to the attention position P so as to draw each of the regions with a different resolution.

If the application execution block 53 is displaying a composite image and a change occurs in the line-of-sight/ screen correlation, then the position on which the user is actually focusing (the true attention position) cannot be displayed with a high resolution, thereby causing a problem. Therefore, while a composite image is displayed, it is especially desirable that a shift of the true attention position from the high-resolution region can be detected. Therefore, the calibration processing block 54 executes calibration processing with a predetermined timing while a composite image is displayed. It should be noted that such calibration processing may be executed continuously (namely, constantly while a composite image is displayed) or with a timing with predetermined conditions satisfied. The following describes specific examples of the calibration processing to be executed while a composite image is displayed.

The attention region identification block 54a sets the high-resolution region H and the regions therearound (hereafter referred to as outer regions O) as the attention region A. The outer region O is a ring-shaped region that surrounds the high-resolution region H. In this example, the brain-wave attention position identification block 54b displays a pattern video that blinks with mutually different patterns for the high-resolution region H and the outer region O and identifies the attention position P by use of the brain waves of the user that are measured while this pattern video is displayed. This setup allows the discrimination whether the user is focusing on a position inside the high-resolution region H or a position inside the outer region O. If the user is focusing on a position inside the outer region O, then the correlation identification block 54c redefines the line-of-sight/screen correlation by use of the results of the identification done by the brain-wave attention position identification block 54b. Subsequently, the line-of-sight attention position identification block 52 identifies the attention position P by use of the redefined line-of-sight/screen correlation and the application execution block 53 draws a composite image with the region including the identified attention position P being the high-resolution region H. Consequently, the position focused by the user can be drawn in a high resolution.

Figure 5:
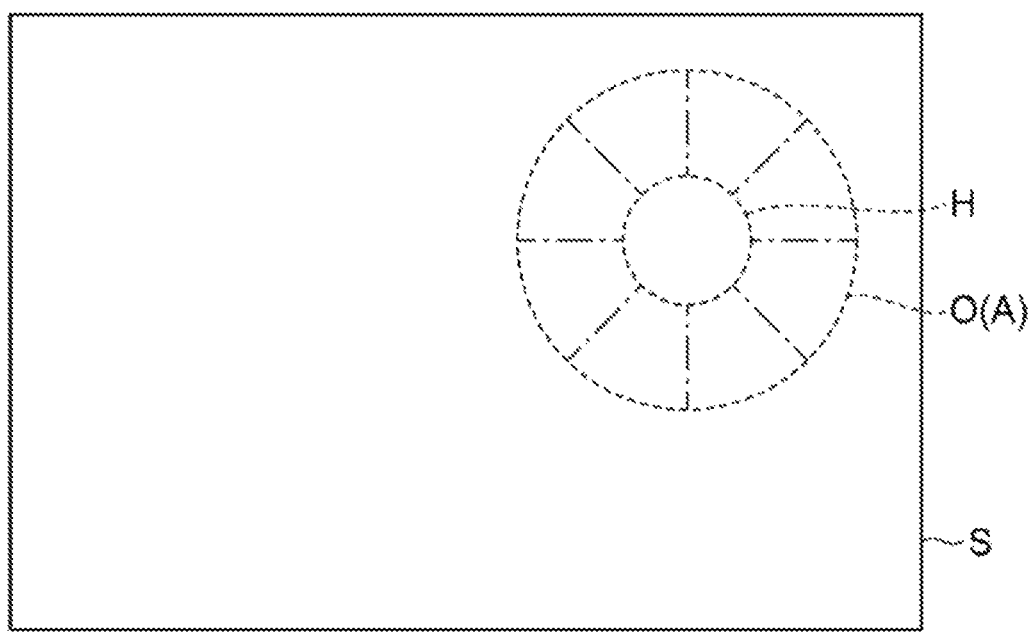
FIG. 5 is a diagram illustrating still another example of a region of attention that is set inside a display screen.

Further, the brain-wave attention position identification block 54b may execute the processing of stepwise identifying the attention position P. To be more specific, for the processing of the first step, the brain-wave attention position identification block 54b executes the processing of identifying whether the true attention position of the user is the high-resolution region H or the outer region O. In this case, the brain-wave attention position identification block 54b displays, all over the outer region O, a pattern video that blinks with a frequency different from that of the high-resolution region H. Consequently, if it is determined that the user is focusing inside the high-resolution region H, no more processing is executed and the normal drawing processing is continued. On the other hand, if it is determined that the user is focusing inside the outer region O, the inside of the outer region O is divided in a radial manner, for example, so as to display a pattern video that blinks with a different frequency for each of the divided regions as the processing of the second step. Referring to FIG. 5, there is depicted a diagram illustrating one example of the outer region O divided into two or more regions in the above-mentioned case. In this example, the outer region O enclosed with dashed lines is equivalent to the attention region A and the dash-dot lines are indicative of each of the regions obtained by radially dividing the outer region O. The processing of the second step allows the brain-wave attention position identification block 54b to identify in detail on which position inside the outer region O the user is focusing. According to the stepwise processing described above, a comparatively simple pattern video may only be displayed until the true attention position gets out of the high-resolution region H.

It should be noted that, if the above-mentioned stepwise identification processing is executed on the attention position P, a range in which a pattern video is displayed may be changed between the processing of the first step and the processing of the second step. For example, in the processing of the first step, a pattern video may be displayed all over the display screen S. Further, in the execution of the processing of the second step, it is known beforehand that the position on which the user focuses is away from the high-resolution region H, so that a pattern video may not be displayed inside the high-resolution region H. That is, in the execution of stepwise processing, a comparatively wide range is set as the attention region A in the first step; in the next step, a region narrower than the attention region A in the preceding step determined to include the attention position P in the preceding step is set as a new attention region A, thereby displaying a pattern video in that range. Thus, repeating the processing of identifying the region on which the user focuses inside that attention region A while narrowing the attention region A allows the stepwise narrowing of the attention position P.

Further, it is also practicable for the attention region identification block 54a to identify the attention region A by use of the results of the measurement of the brain waves done by the brain-wave measurement apparatus 40. To be more specific, it is known that, when the display element on which the user is focusing is displayed on the display screen S, the waveform reacting to this displaying appears in the brain waves. Hence, if two or more display elements are sequentially displayed at mutually different positions, referencing the results of the measurement of the brain waves allows the identification of the display element of which the user is aware. According to this technique, the instruction input for selecting any one of two or more elements can be realized without requiring the user to manipulate the manipulation device. At this moment, it is assumed that the user directs the line-of-sight to the position at which the display element focused by the user is displayed. Therefore, if the display element focused by the user has been identified by use of the results of the measurement of the brain waves, the attention region identification block 54a may identify, as the attention region A, the region centered at the position at which the identified display element is displayed.

Figure 6:
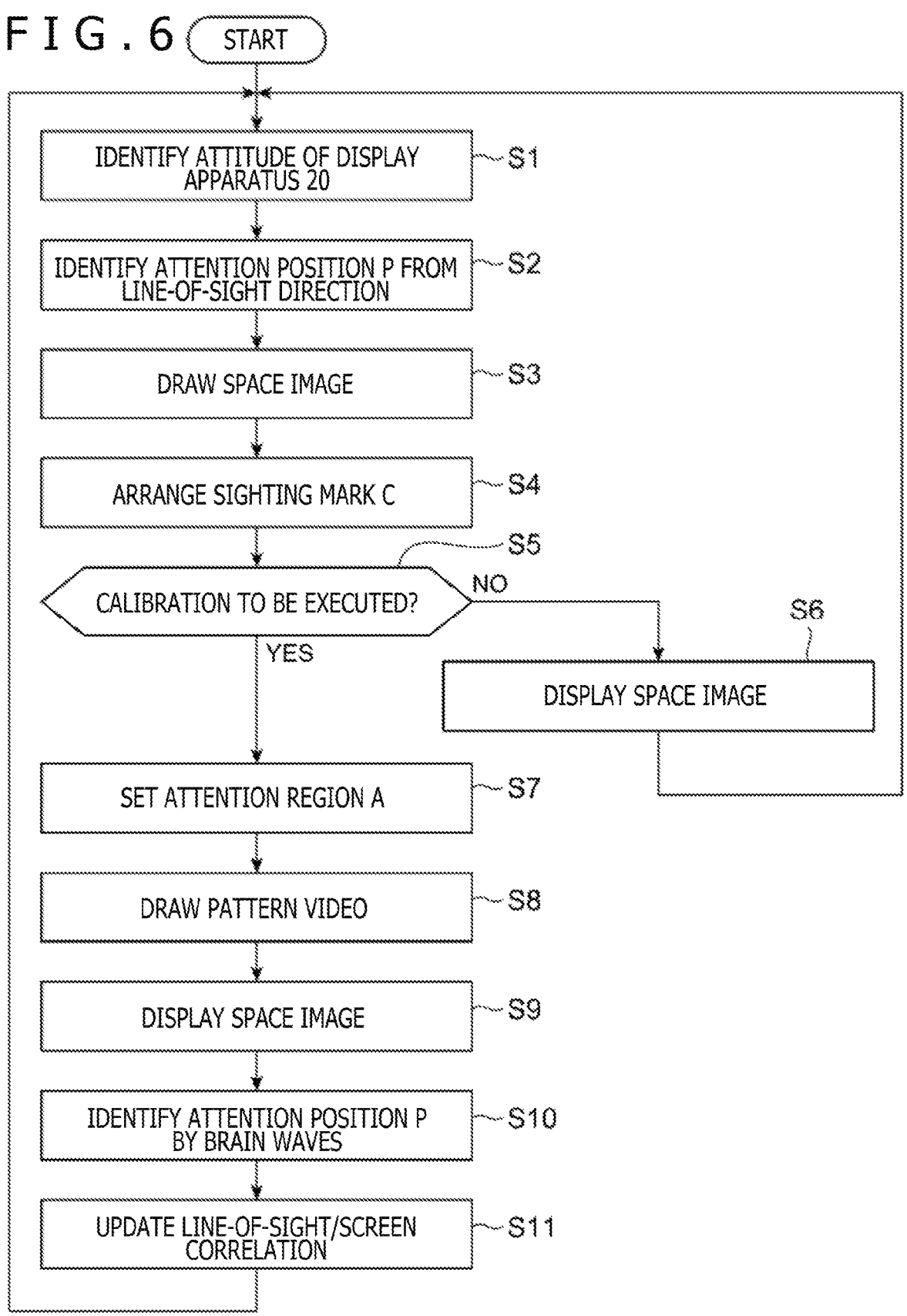
FIG. 6 is a flowchart indicative of one example of a flow of processing that is executed by an information processing apparatus practiced as one embodiment of the present disclosure.

The following describes specific examples of flows of the processing to be executed by the control block 11 of the line-of-sight detection apparatus 10 related with the present embodiment with reference to the flowchart illustrated in FIG. 6. In what follows, it is assumed, as a specific example, that the application execution block 53 executes a program of a shooting game as illustrated in FIG. 4 and the calibration processing block 54 executes calibration processing during execution of this shooting game. Further, it is assumed that the display apparatus 20 is a head-mounted display used as worn on the head of the user and the line-of-sight detection apparatus 10 identifies the attitude (the orientation) of the display apparatus 20 by use of a motion sensor or the like built in the display apparatus 20, thereby updating images in accordance with the identified attitude. Still further, it is assumed in this example that the application execution block 53 changes the display position of the sighting mark C in accordance with the attention position P to be identified by the line-of-sight attention position identification block 52.

First, the application execution block 53 identifies the attitude (the orientation) of the display apparatus 20 by use of the results of the detection by a motion sensor or the like (S1). Further, the line-of-sight attention position identification block 52 identifies the attention position P on the basis of the line-of-sight direction to be identified by the line-of-sight direction identification block 51 and the line-of-sight/screen correlation identified by the calibration processing executed in the past (S2).

Next, the application execution block 53 draws a space image indicative of a manner in which the inside of a virtual space is viewed from the direction corresponding to the attitude identified in S1 (S3). Then, the sighting mark C is arranged at the position inside the space image corresponding to the attention position P identified in S2 (S4).

Next, the calibration processing block 54 determines whether to execute calibration processing or not (S5). For example, the calibration processing block 54 may determine that calibration processing is to be executed when a predetermined time has passed since the last calibration processing. Alternatively, the calibration processing block 54 may determine that calibration processing is to be executed if the sighting mark C is found not moved by a great distance for a time longer than a predetermined time. If calibration processing is determined not to be executed, then a space image including the sighting mark C is displayed on the display screen S of the display apparatus 20 (S6). Then, the processing procedure returns to S1 to execute the processing of the next cycle.

On the other hand, if the calibration processing is determined to be executed in S5, then the attention region identification block 54a sets the attention region A centered at the position at which the sighting mark C is arranged in S4 (S7). In this example, the attention region A is identified in accordance with the attention position P identified by the line-of-sight attention position identification block 52. In the space image drawn in S3, the brain-wave attention position identification block 54b draws a pattern video inside the attention region A set in S7 in a superimposed manner (S8). Then, the space image including the content of the pattern video is displayed on the display screen S of the display apparatus 20 (S9).

Subsequently, by use of the brain waves measured by the brain-wave measurement apparatus 40, the brain-wave attention position identification block 54b attempts the identification of the attention position P (S10). If the attention position P is identified, then the correlation identification block 54c updates the content of the line-of-sight/screen correlation (to be more specific, the conversion parameter for converting a line-of-sight direction into a position inside the display screen S) such that the shift between the attention position P identified in S2 and the attention position P identified in S10 is corrected (S11).

In any of the case where the line-of-sight/screen correlation has been updated and the case where the identification of the attention position P by the brain waves has not been completed, the processing procedure returns to S1 to execute the processing of the next cycle. If the update of the line-of-sight/screen correlation is executed and then the line-of-sight attention position identification block 52 identifies the attention position P in S2 in the next cycle, the identification is executed on the basis of the updated line-of-sight/screen correlation. Repeating the processing operations as described above allows the continuous processing of the game while regularly updating the line-of-sight/screen correlation.

As described above and according to the line-of-sight detection apparatus 10 related with the present embodiment, the attention position P is identified on the basis of the line-of-sight direction of the user at normal time, so that, as compared with the identification of the attention position P by constantly measuring the brain waves of the user, the identification of the attention position P can be executed while displaying any given video. In addition, in executing the calibration processing for identifying the correlation between a line-of-sight direction and a position inside the display screen S, the results of the measurement of the brain waves can be used so as to eliminate the necessity of having the user intentionally watch a particular position, thereby comparatively mitigating the load of the user.

Further, selectively displaying a pattern video in an attention region A of the display screen S allows the execution of calibration processing while displaying a video drawn by an application program during the execution of the application program, for example.

It should be noted that the embodiments of the present disclosure are not limited to those described above. For example, in the description done above, the functions of the line-of-sight direction identification block 51, the line-of-sight attention position identification block 52, and the calibration processing block 54 are realized by programs other than an application program; however, it is also practicable to realize some or all of these functions within the application program.

Further, in the description done above, when the calibration processing is executed, a pattern video is always selectively displayed in an attention region A of the display screen S; however, depending upon a scene, it is also practicable to execute calibration processing by displaying a pattern video all over the display screen S. In this case, it is not necessary to estimate the attention region A; namely, the calibration processing can be executed wherever the user is watching in the display screen S.

The present disclosure contains subject matter related to that disclosed in Japanese Priority Patent Application JP 2017-219750 filed in the Japan Patent Office on Nov. 15, 2017, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A line-of-sight detection apparatus connected to a brain-wave measurement apparatus configured to measure brain waves of a user, a pupil observation apparatus such as a camera or an infrared sensor to observe a pupil of the user, and a display apparatus, the line-of-sight detection apparatus comprising:
   a brain wave attention position identification block configured to identify, by use of measurement results by the brain-wave measurement apparatus obtained when a video having a first predetermined pattern is displayed on a screen of the display apparatus, an attention position of the user inside the screen; and
   a correlation identification block configured to identify a correlation between a line-of-sight direction of the user executed by the pupil observation apparatus and the identified attention position inside the screen executed by a brain wave attention region identification block; and
   wherein, according to a predetermined timing, the brain wave attention region identification block:
   determines an attention region comprising:
   a first region comprising the attention position;
   a second region surrounding the first region; and
   wherein a size of the attention region is less than a size of the display;
   displays the first predetermined pattern in the first region and displays a second predetermined pattern in the second region;
   if the second predetermined pattern is detected by the brain-wave measurement apparatus, the correlation identification block updates a location of the attention position and confirms the updated attention position by use of observation results of the pupil observation apparatus; and
   wherein, if the second predetermined pattern is detected by the brain-wave measurement apparatus, a size of the second region is stepwise narrowed until the updated attention position is identified.

2. The line-of-sight detection apparatus according to claim 1, wherein
   the brain wave attention region identification block identifies a region that includes an attention object assumed to be focused by the user, the region being displayed on the screen, as the attention region.

3. The line-of-sight detection apparatus according to claim 2, wherein
   the attention object is an object selected by the user from among a plurality of optional objects.

4. The line-of-sight detection apparatus according to claim 2, wherein
   the attention object is an object that moves inside the screen as instructed by the user.

5. A control method of a line-of-sight detection apparatus connected to a brain-wave measurement apparatus configured to measure brain waves of a user, a pupil observation apparatus such as a camera or an infrared sensor to observe a pupil of the user, and a display apparatus, the control method comprising:
   identifying, by use of measurement results by the brain-wave measurement apparatus obtained when a video having a first predetermined pattern is displayed on a screen of the display apparatus, an attention position of the user inside the screen;
   identifying a correlation between a line-of-sight direction of the user executed by the pupil observation apparatus and the identified attention position inside the screen; and
   according to a predetermined timing:
   determining an attention region comprising:
   a first region comprising the attention position;
   a second region surrounding the first region; and
   wherein a size of the attention region is less than a size of the display;
   displaying the first predetermined pattern in the first region;
   displaying a second predetermined pattern in the second region; and
   if the second predetermined pattern is detected by the brain-wave measurement apparatus, updating a location of the attention position; and
   confirming the updated attention position by use of observation results of the pupil observation apparatus; and
   wherein, if the second predetermined pattern is detected by the brain-wave measurement apparatus, a size of the second region is stepwise narrowed until the updated attention position is identified.

6. A non-transitory computer readable medium having stored thereon a program for a computer connected to a brain-wave measurement apparatus configured to measure brain waves of a user, a pupil observation apparatus such as a camera or an infrared sensor to observe a pupil of the user, and a display apparatus, the program comprising:
- by a brain wave attention position identification block, identifying, by use of measurement results by the brain-wave measurement apparatus obtained when a video having a first predetermined pattern is displayed on a screen of the display apparatus, an attention position of the user inside the screen;
- by a correlation identification block, identifying a correlation between a line-of-sight direction of the user executed by the pupil observation apparatus and a the identified attention position inside the screen; and
- by a brain wave attention region block, according to a predetermined timing:
- determining an attention region comprising:
  - a first region comprising the attention position;
  - a second region surrounding the first region; and
  - wherein a size of the attention region is less than a size of the display;
- displaying the first predetermined pattern in the first region;
- displaying a second predetermined pattern in the second region;
- if the second predetermined pattern is detected by the brain-wave measurement apparatus, the correlation identification block updates a location of the attention position and confirms the updated attention position by use of observation results of the pupil observation apparatus; and
- wherein, if the second predetermined pattern is detected by the brain-wave measurement apparatus, a size of the second region is stepwise narrowed until the updated attention position is identified.

* * * * *